United States Patent
Anderson

(10) Patent No.: US 11,306,839 B1
(45) Date of Patent: Apr. 19, 2022

(54) DOUBLE POPPET CHECK VALVE FOR LOW AND HIGH FLOW RATES

(71) Applicant: MERRILL MANUFACTURING COMPANY, Storm Lake, IA (US)

(72) Inventor: Stephen J. Anderson, Storm Lake, IA (US)

( * ) Notice: Subject to any disclaimer, the term of this patent is extended or adjusted under 35 U.S.C. 154(b) by 0 days.

(21) Appl. No.: 17/099,891

(22) Filed: Nov. 17, 2020

(51) Int. Cl.
*F16K 15/00* (2006.01)
*F16K 17/30* (2006.01)
*F16K 15/02* (2006.01)

(52) U.S. Cl.
CPC .............. *F16K 17/30* (2013.01); *F16K 15/028* (2013.01); *Y10T 137/7841* (2015.04)

(58) Field of Classification Search
CPC ......... Y10T 137/7841; Y10T 137/7838; Y10T 137/7784; F16K 15/066
See application file for complete search history.

(56) References Cited

U.S. PATENT DOCUMENTS

| | | | | |
|---|---|---|---|---|
| 367,726 A | * | 8/1887 | Penney | F04B 53/00 417/454 |
| 423,003 A | * | 3/1890 | Vielhaber | F16K 15/025 137/512.2 |
| 1,031,754 A | * | 7/1912 | Westway | F02M 21/00 123/585 |
| 1,109,154 A | * | 9/1914 | Thomas | F04B 39/128 417/255 |
| 1,323,168 A | * | 11/1919 | Rigne | F04B 33/005 417/547 |
| 5,176,171 A | * | 1/1993 | Andersson | F16K 15/063 137/512.1 |
| 8,578,963 B2 | * | 11/2013 | Richter | F23L 11/005 137/512.2 |
| 2004/0177888 A1 | * | 9/2004 | Heeks | F16K 17/30 137/599.18 |
| 2005/0087234 A1 | * | 4/2005 | Ito | F17D 5/06 137/554 |

* cited by examiner

*Primary Examiner* — Robert K Arundale
(74) *Attorney, Agent, or Firm* — Zarley Law Firm P.L.C.

(57) ABSTRACT

A poppet-style check valve comprising a small poppet and a large poppet. When low flow rates are required, the small poppet opens and permits the low flow rate to pass efficiently. When demand for flow increases, the large poppet opens, permitting efficient passage of higher flow rates.

2 Claims, 5 Drawing Sheets

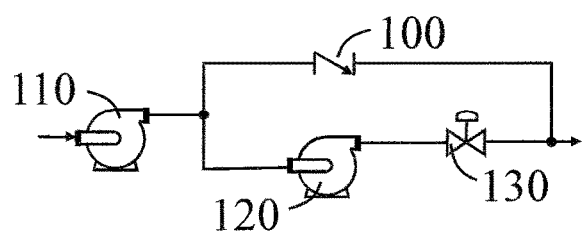
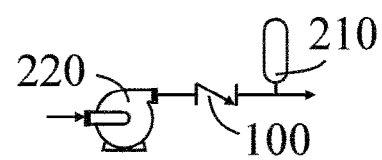
Fig. 1
Fig. 2
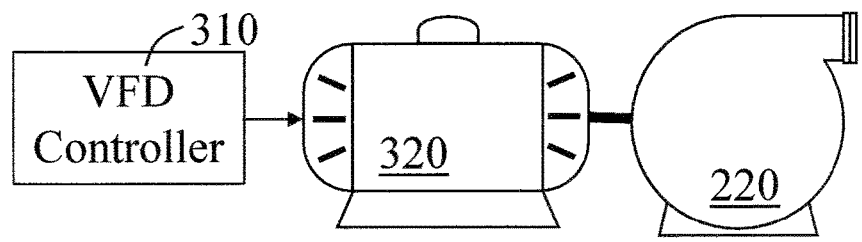
Fig. 3
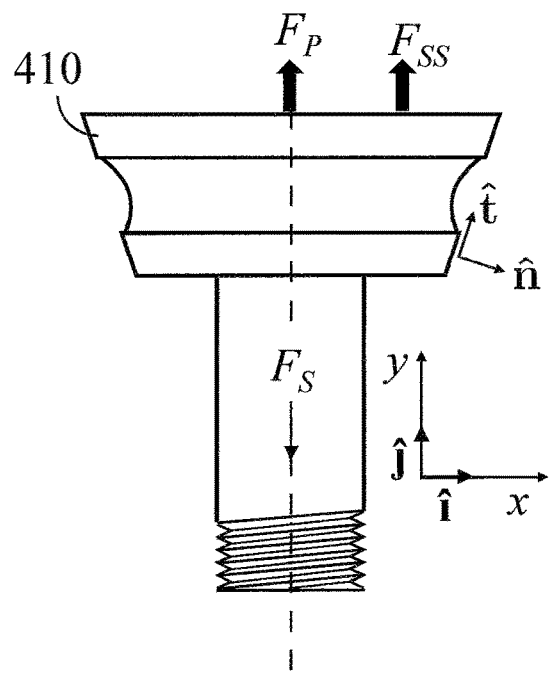
Fig. 4

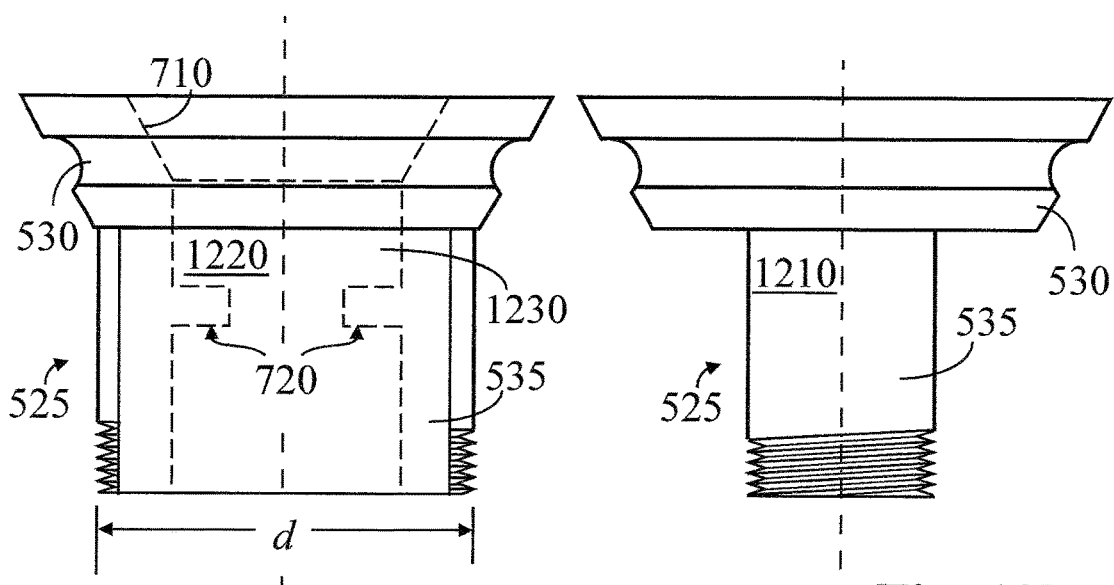
Fig. 12a
Fig. 12b
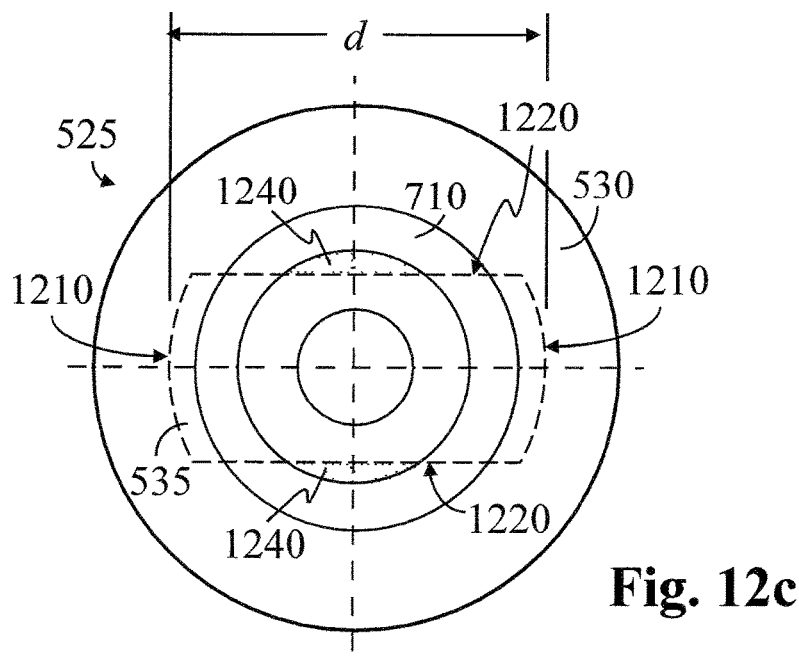
Fig. 12c

DOUBLE POPPET CHECK VALVE FOR LOW AND HIGH FLOW RATES

TECHNICAL FIELD

This invention relates generally to an improved check valve and more particularly to a poppet check valve having two poppets for better handling of low, moderate, and high flow rates.

BACKGROUND

Check valves, sometimes called nonreturn valves or one-way valves, are incorporated into fluid transport piping for the purpose of enforcing unidirectional flow in the pipes. A number of check valve designs are commonly available, and are illustrated in the book, *Flow of Fluids Through Valves, Fittings, and Pipe*, (1988) Technical Paper No. 410, published by the Crane Company in King of Prussia, Pa. This book is hereby incorporated in its entirety by reference.

Poppet check valves comprise a spring-retained plug, the poppet, wherein a pressure difference across the poppet overcomes the spring force, thereby opening the check valve. When the pressure difference reduces sufficiently—such as when it is trending toward a sign change, which would result in reversed flow—the poppet closes because the spring force in the direction of closing of the check valve is greater than the force due to the pressure difference. Hence, unidirectional flow is enforced.

Poppet valves for small flow rates have diminutive geometries so the required pressure difference may be achieved despite the small flow rate. Therefore, the poppet is of small diameter, relatively speaking. Likewise, poppet valves for relatively large flow rates have relatively large geometries. Here, the diameter of the poppet is relatively larger.

Demand for fluid flow rate may vary greatly in a pump and piping system. The flow rate may be varied to meet that demand by varying the opening of a throttling valve in series with the pump, adjusting variable geometry of the pump, itself, providing multiple, optional pumps in series or parallel, varying the rotational speed of the pump, or some combination of these. For variable speed pumps, Variable Frequency Drives (VFD) have become ubiquitous, and permit efficient and wide variation in pump rotational speeds as long as pump critical speeds are not approached.

At low flow rates, and hence, low pressure differences, the poppet may open only partially. Despite the pressure ratio being inadequate for full opening, partial opening results in an inordinately large pressure drop compared to a properly-sized poppet for the flow rate. Hence, flow through an incompletely opened check valve is inefficient. Many times, however, in low flow rates, the poppet opens and closes, periodically—that is, chatter—producing noise, unsteady flows in the piping, and rapid wear on the check valve components, besides a generally inefficient flow.

A too-small poppet check valve, that is, one that is inadequately sized for a given flow rate, will also present a greater than necessary pressure drop to the fluid flow.

Accordingly, there is a need for a modified poppet-style check valve allowing for efficient and steady low flow rates as well as moderate and high flow rates.

SUMMARY OF THE INVENTION

The present invention relates to an improved poppet-style check valve having two poppets. One of said poppets is smaller and is nested, concentrically, in a larger poppet. The small poppet is held closed by a correspondingly lighter spring force so a low positive flow rate may cause the small poppet to open. The larger poppet is held closed by a spring requiring a greater force than the small poppet. The larger poppet remains closed while the smaller poppet passes low flow rates. When greater flow rates are required, the pressure drop increases across the poppets, and the larger poppet opens to pass said larger flow rate.

A double poppet style check valve permits steady, efficient flows at lesser, moderate, and greater flow rates.

BRIEF DESCRIPTION OF THE DRAWINGS

The above needs are at least partially met through provision of the apparatus described in the following detailed description, particularly when studied in conjunction with the drawings, wherein:

FIG. 1 is a schematic diagram of a piping network with two pumps in series;

FIG. 2 is a schematic diagram of a piping network including a pump and an accumulator;

FIG. 3 is a schematic diagram of a variable frequency drive, an electric motor, and a pump;

FIG. 4 is a side elevation of a poppet showing various forces acting thereon;

FIG. 12a shows a first side elevation view of the large poppet;

FIG. 12b shows a second side elevation view of the large poppet; and

FIG. 12c shows a plan view of the large poppet.

Figure 5:
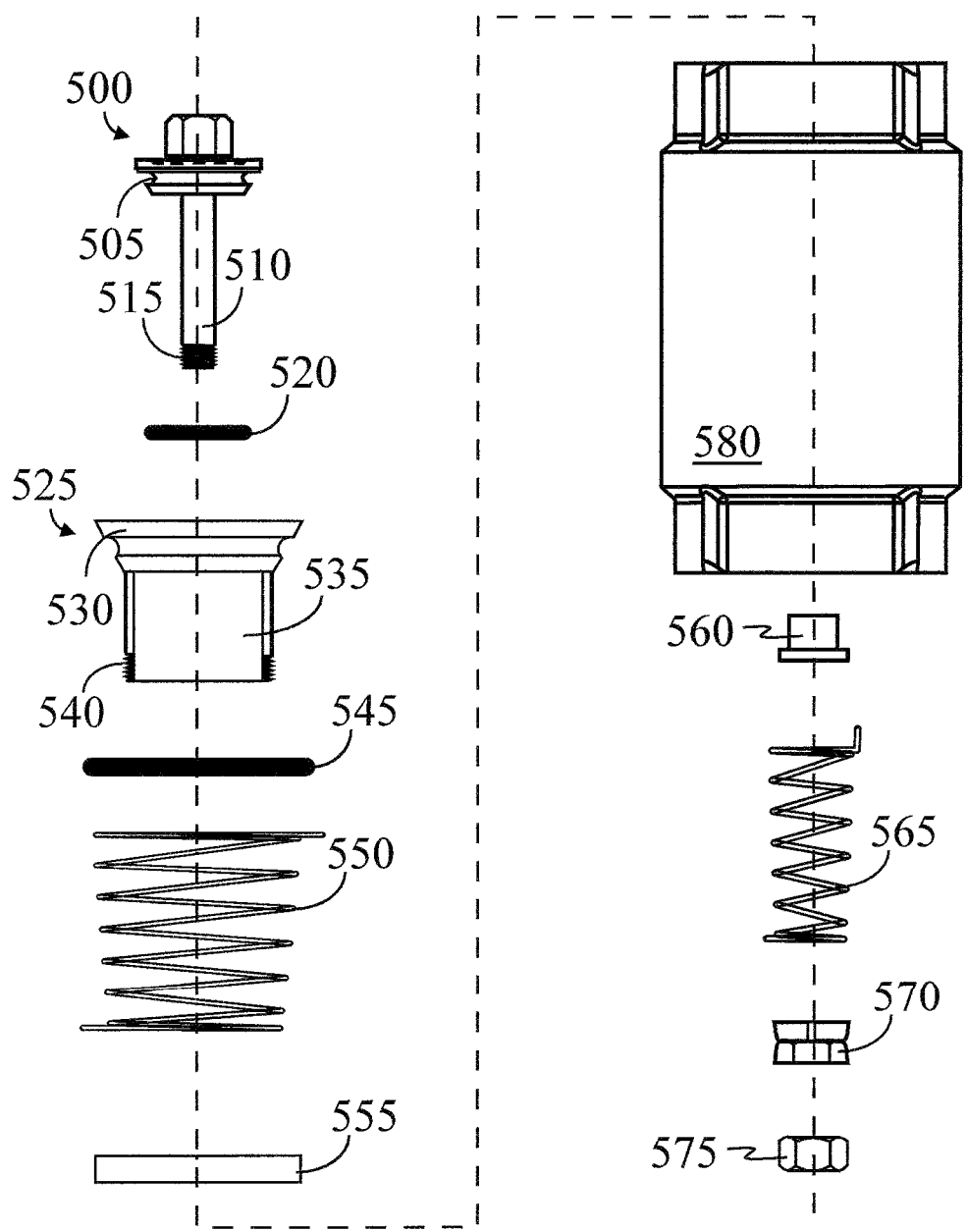
FIG. 5 is an exploded view of a double poppet check valve of the present invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above, except where different specific meanings have otherwise been set forth herein.

Orientation of the figures are arbitrary. Orientation of the apparatus in practice is not limited to the orientation shown in the figures.

Filling, such as diagonal hatching, cross-hatching, dots, etc., indicates a cross-section or sliced view, or is used to differentiate features from neighboring features. In particular, such filling is not intended to convey material information.

DETAILED DESCRIPTION

Referring now to the drawings, wherein like reference numerals indicate identical or similar parts throughout the several views, FIG. 1 shows a schematic diagram of a piping network constructed to permit the operation of a single pump 110 or two pumps 110, 120 in series. When both pumps 110, 120 operate simultaneously, the check valve 100 remains closed due to the negative pressure difference developed by the high pressure pump 120. Hence, all the fluid passes through both the low pressure pump 110 and the high pressure pump 120.

To effect the switch between the two modes of operation—the employment of two pumps to the employment of one pump—the driver (not shown) for the high pressure pump 120 is shut down and the throttling valve 130 is closed. Because of the pressure difference developed across the check valve 100, the check valve 100 opens and permits fluid to travel from the low pressure pump 110 to the destination without encountering the high pressure pump 120.

Another example of the use of a check valve is shown in FIG. 2. When an accumulator 210 exists, or pockets of gas gather in the piping network, a turbo pump 220 may surge at low flow rates. Surge is a phenomenon characterized by reversed flow through the pump 220. The event causes large and rapidly changing forces on the pump 220, and can damage or even destroy it. A check valve 100 disposed to disallow reversed flow may reduce or eliminate the danger.

A typical speed-control system is briefly illustrated in FIG. 3. A Variable Frequency Drive (VFD) 310 develops a varying frequency signal supplied to the electric motor 320, resulting in a variable speed electric motor 320. The pump 220 is driven by the electric motor 320, and is, hence, a variable speed pump 220. The pump's 220 performance is a direct result of its rotational speed. Low fluid flow rates demand low rotational speeds. Likewise, high rotational speeds result in relatively higher fluid flow rates. Wide variations in pump performance are possible using a VFD control system 310 on the pump's 220 electric motor 320.

Referring now to FIG. 4, a free body diagram of a poppet 410 from a double poppet check valve 610 (see FIG. 6) is shown along with the forces $F_P$, $F_{SS}$, $F_S$ acting on said poppet. The force, $F_s$, is the force due to the spring (not shown in FIG. 4). The force, $F_P$, is the net y-direction force due to the pressure, p, over the entire poppet 410 surface. It is calculated as a surface integral:

$$F_P = -\int_s p \hat{n} \cdot \hat{j} dA$$

where $\hat{n}$ is a unit vector normal to the poppet surface and pointing away from the poppet body, an example of which is illustrated in FIG. 4. The unit vector, $\hat{j}$, is the unit vector in the y-direction, as shown in FIG. 4, and A is the surface area of the poppet 410. The force, $F_{SS}$, is the force in the y-direction due to shearing stresses, $\tau$, and may be calculated as another surface integral:

$$F_{SS} = \int_s \tau \hat{t} \cdot \hat{j} dA$$

where $\hat{t}$ is a unit vector tangent to the surface and facing in the flow direction and $\tau$ is the shearing stress.

Applying Newton's second law to the poppet as the free body diagram, and considering only the case when the poppet is not accelerating, we have:

$$F_{SS} + F_P - F_S = 0$$

Hence:

$$F_S = F_{SS} + F_P$$

In other words, the poppet check valve will be open when the sum of the pressure and shearing forces exceed the spring's force.

In *Flow of Fluids Through Valves, Fittings, and Pipe*, (1988), for a particular configuration for a single poppet check valve, it is suggested the condition a single poppet check valve may be considered fully open is calculated as a constant pressure coefficient, $C_P$:

$$C_P = \frac{\Delta p}{\frac{1}{2}\rho V^2} = \text{Constant}$$

where $\Delta p$ is the pressure difference across the single poppet check valve, V is the velocity of the fluid in the pipe, and $\rho$ is the density of the fluid. Apparently, the assumption is tacitly made that the force $F_{SS}$ due to shearing stress is negligible.

Pressure coefficient and modeling piping components are covered in many undergraduate fluid mechanics textbooks, such as *Fundamentals of Fluid Mechanics*, 7th ed. (2013), John Wiley and Sons, Inc., hereby incorporated in its entirety by reference.

Figure 6:
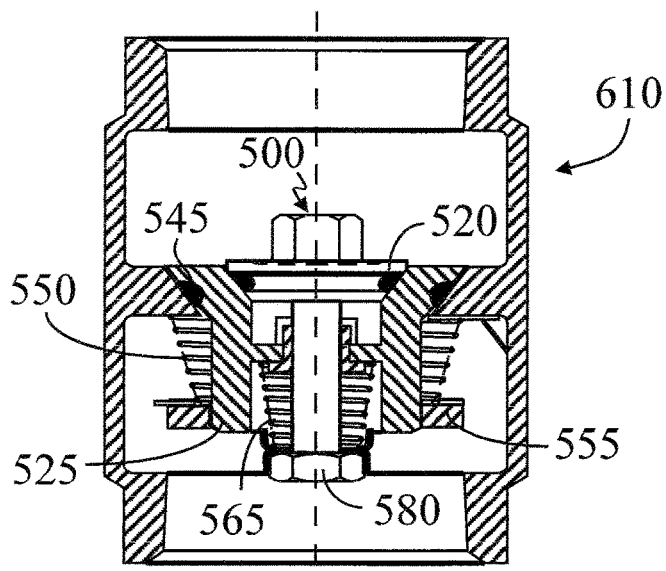
FIG. 6 is an assembled, partial cutaway view of the double poppet check valve of the present invention.
Figure 7:
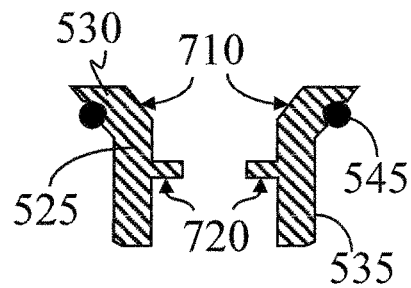
FIG. 7 is a cutaway view of a large poppet of the double poppet check valve of the present invention.

Viewing, now FIGS. 5 and 6, a small poppet 500 within a double poppet check valve comprises a small poppet head 505, a small poppet stem 510 having small poppet stem threads 515. A small O-ring 520 is disposed about the small poppet head 505 and seals against a large poppet seat 710, as shown in FIGS. 7 and 12.

Figure 8:
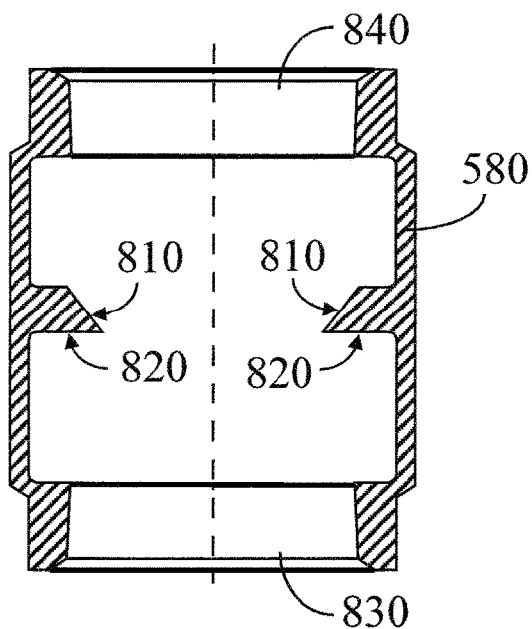
FIG. 8 is a cutaway view of a body of the double poppet check valve of the present invention.

A large poppet 525 comprises a large poppet head 530, a large poppet stem 535, and large poppet threads 540 integral to the large poppet stem 535. A large O-ring 545 is disposed about the large poppet head 530 and seals against a body seat 810 within a double poppet check valve body 580, as seen in FIG. 8.

A large poppet spring 550 resists a force of a pressure difference across the large poppet 525. The large poppet spring 550 bears against a large poppet nut 555 at one end and against a stationary surface 820 within the double poppet check valve body 580. When the large poppet 525 moves relative to the double poppet check valve body 580, a degree of compression of the large poppet spring 550 varies, and hence a spring force, $F_S$.

The large poppet nut 555 includes female threads (not shown) that mate with the large poppet threads 540.

A sleeve 560 is inserted into the large poppet stem 535 against a shoulder 720 and about the small poppet stem 510 to provide a bearing surface for the motion of the small poppet stem 510 relative to the large poppet 525.

A small poppet spring 565 is necessary for holding the small poppet 500 closed when insufficient pressure force $F_P$ exists to force the small poppet 500 open. One end of the small poppet spring 565 bears against the sleeve 560, which in turn, bears against the shoulder 720. The other end of the small poppet spring 565 is captured by a cup 570, held in place by a small poppet nut 575.

The small and large poppets 500, 525, as illustrated in FIG. 6, are disposed in their closed position. There is no flow through the double poppet check valve 100 when both the small and large poppets 500, 525 are closed.

The double poppet check valve 610 of the instant invention also comprises an inlet port 830 and a discharge port 840.

Figure 9:
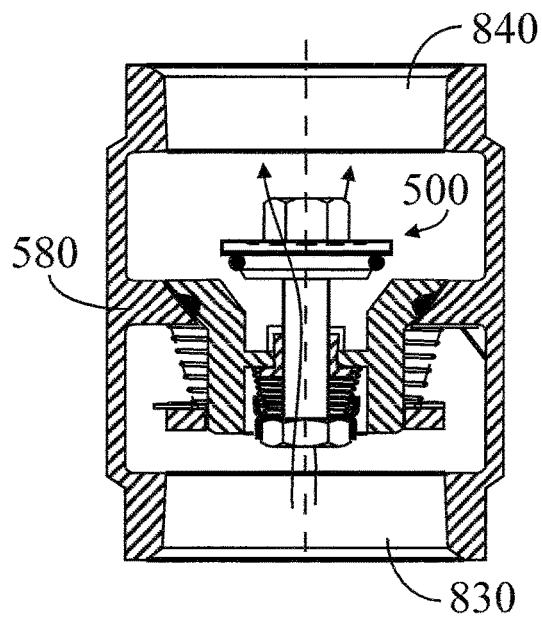
FIG. 9 is an assembled, partial cutaway view of the double poppet check valve of the present invention shown with a small poppet in an open position.

In FIG. 9, the double poppet check valve 100 is shown with the small poppet 500 in its open position. When the flow demand is such that the pressure difference across the small poppet 500 exceeds a threshold value, the small poppet 500 will open, permitting fluid to flow through it. The large poppet 525 remains closed if said pressure difference is insufficient to open the large poppet 525.

Figure 10:
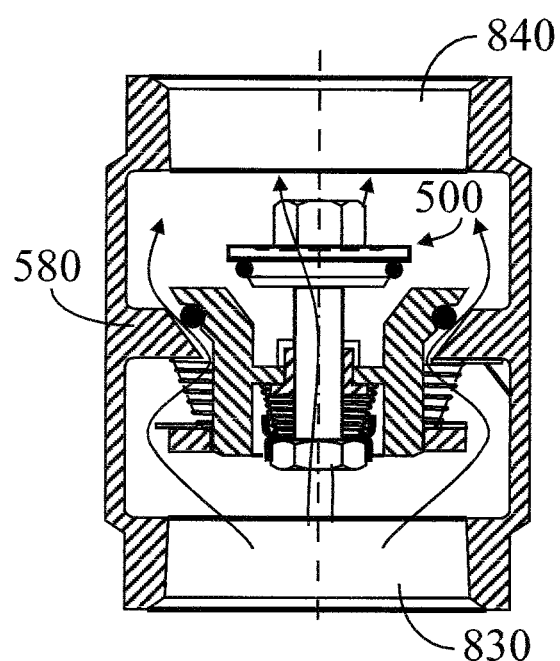
FIG. 10 is an assembled, partial cutaway view of the double poppet check valve of the present invention shown with the small poppet and a large poppet both open.

In FIG. 10, the demand for flow has increased such that the pressure difference across the large poppet 525 has exceeded a threshold value, causing the large poppet 525 to open. The small poppet 500 remains in its open position because the pressure difference across the poppets 500, 525 is adequate to overcome both poppet spring 550, 565 forces.

Figure 11:
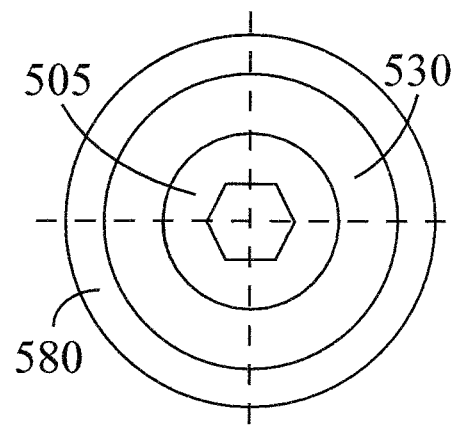
FIG. 11 shows a plan view of the small and large poppets.

FIG. 11 shows the large and small poppets 500, 525 disposed concentrically with respect to one another.

The large poppet 525 is shown in several orientations in FIGS. 12a, 12b, and 12c. The large poppet stem 535 is not right-circular cylindrical. The cross-sectional shape may be seen by the dashed lines in the plan view of FIG. 12c. The surfaces of the broad sides 1210 of the large poppet stem 535 are preferably planar. In FIG. 12c, the broad sides 1210 are shown as straight dashed lines. The side elevation view of FIG. 12a shows one planar broad side 1210 of the large poppet stem 535. The narrow sides 1220 of the large poppet stem 535 are, preferably, formed as portions of a right circular cylinder of diameter, d. In FIG. 12b, one narrow side of the large poppet stem 535 is clearly seen in side elevation.

The interiors of the large poppet head 530 and stem 535 are machined, cast, molded, extruded, or otherwise formed to provide structure and support for the small poppet 500. Viewing the side elevation view of FIG. 12a includes dashed lines to indicate the interior of the large poppet 525. At the top, the large poppet seat 710 comprises a portion of a cone. As the large poppet 525 is oriented in FIG. 12a, the diameter of the large poppet seat 710 is greater at the top and lesser at the bottom. This orientation in no way limits the orientation of the double poppet check valve 610 in use.

The upper right-circular cylindrical aperture 1230 of the interior of the large poppet 525, just beneath the large poppet seat 710, has a diameter greater than a width of the narrow sides 1220 of the large poppet stem 535. This is most clearly seen in FIG. 12c. The shaded regions indicate flow apertures 1240 by which fluid flows when the small poppet 100 is open.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

What is claimed:

1. A double poppet check valve comprising:
   a double poppet check valve body;
   an inlet port by which a fluid enters the double poppet check valve;
   a discharge port by which a fluid exits the double poppet check valve;
   a small poppet permitting the passage of the fluid from the inlet port to the discharge port;
   a large poppet permitting the passage of the fluid from the inlet port to the discharge port;
   a large poppet head;
   a large poppet seat disposed in the large poppet head;
   a large poppet stem;
   a broad side of the large poppet stem;
   a narrow side of the large poppet stem, wherein the narrow side is narrower than the broad side;
   an aperture in the large poppet head, said aperture having a diameter greater than a width of the narrow side of the large poppet stem;
   a shoulder inside the large poppet stem;
   a large poppet spring disposed about the large poppet stem;
   a small poppet head fitted to the large poppet seat;
   a small poppet stem disposed in the aperture in the large poppet head and through a second aperture formed by the shoulder inside the large poppet stem; and
   a small poppet spring disposed about the small poppet stem;
   a first pressure coefficient at which the small poppet opens fully; and
   a second pressure coefficient, not equal to the first pressure coefficient, at which the large poppet opens fully.

2. The double poppet check valve of claim 1 wherein the first pressure coefficient is less than the second pressure coefficient.

* * * * *